July 23, 1968 E. F. MILLER 3,394,050
METHOD OF OPERATING A NEUTRONIC REACTOR FOR REFORMING
GAS MIXTURES AND PRODUCING HEAT FOR MULTI-PURPOSES
Filed March 24, 1967 2 Sheets-Sheet 1

INVENTOR.
Edward Francis Miller
BY

ATTORNEY.

United States Patent Office 3,394,050
Patented July 23, 1968

3,394,050
METHOD OF OPERATING A NEUTRONIC REACTOR FOR REFORMING GAS MIXTURES AND PRODUCING HEAT FOR MULTI-PURPOSES
Edward Francis Miller, Rockville, Md., assignor to the United States of America as represented by the United States Atomic Energy Commission
Filed Mar. 24, 1967, Ser. No. 626,370
1 Claim. (Cl. 176—39)

ABSTRACT OF THE DISCLOSURE

A method of operating a neutronic reactor to simultaneously produce chemicals and generate heat for electric power production and water desalination. A neutronic reactor is cooled by passing a mixture of steam and a low boiling point hydrocarbon through its active core region where they react endothermically in the presence of a catalyst to form hydrogen and carbon monoxide. The hot reformed coolant gas which discharges from the reactor is converted to carbon dioxide and hydrogen before being passed through a heat-exchange boiler where it gives up heat to generate steam. The generated steam is used as a source for the gas reforming reaction within the reactor, for power generation, and for other purposes including water desalination using known distillation techniques.

BACKGROUND OF THE INVENTION

The invention relates generally to neutronic reactors and more particularly to a multi-purpose neutronic reactor for reforming gas mixtures and for producing, for example, electric power and fresh water from saline water. It was made by the inventor while in the employ of the U.S. Atomic Energy Commission.

A broad application of the invention would utilize the reactor to provide power for transporting saline water from an ocean; convert the saline water to fresh water; produce anhydrous ammonia for addition to the fresh water through an endothermic chemical reaction driven by reactor heat; and to transport the ammoniated, desalinated water inland to irrigate arid land. The design of the reactor would be optimized to provide an allocation of energy generated therein to chemical production, electric power generation and saline to fresh water conversion in proportion to the needs of the geographical area in which the reactor is located.

SUMMARY OF THE INVENTION

A method of operating a neutronic reactor to simultaneously produce chemicals and generate heat for electric power production and water desalination is provided. A neutronic reactor is cooled by passing a mixture of steam and a low boiling point hydrocarbon such as methane through its active core region where they react endothermically in said region or adjacent thereto in the presence of a catalyst to form hydrogen and carbon monoxide. The hot reformed coolant gas which discharges from the reactor, comprising a mixture of reformed hydrogen and carbon monoxide as well as some unconverted hydrocarbon (e.g., methane), is converted to a mixture of carbon dioxide and hydrogen before being passed through a heat-exchange boiler where it gives up heat to generate steam. The generated steam is used to fulfill the requirements of high pressure steam for the gas reforming reaction within the reactor; high pressure steam for power generation; low pressure steam to oxidize carbon monoxide produced in the reactor and thereby produce carbon dioxide; and low pressure steam for other purposes such as water desalination using known distillation techniques. The reformed hydrogen produced in the neutronic reactor may be reacted with nitrogen from the air to produce anhydrous ammonia for direct application to the soil as fertilizer or for mixing with desalinated water for irrigation and fertilization purposes. Synthetic urea may also be produced using steam from the heat exchange-boiler to drive a reaction between carbon dioxide and anhydrous ammonia.

DESCRIPTION OF THE PREFERRED EMBODIMENT

Figure 1:
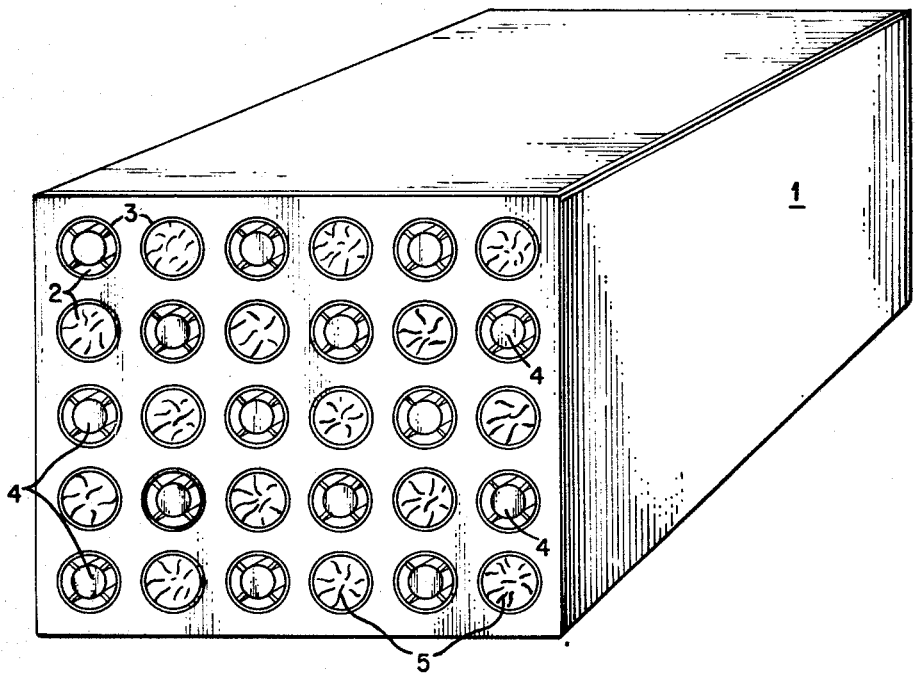
FIG. 1 illustrates a typical active core segment from a graphite moderated reactor suitable for operation according to the invention.

In order to facilitate an understanding of the invention, reference is made to the drawings, initially to FIG. 1, where a section of a graphite block 1 from the active core region of a graphite-moderated neutronic reactor is illustrated. Graphite block 1 is pierced longitudinally by a multiplicity of coolant channels 2 lined with a material such as tungsten coolant tubes 3. As shown, a portion of coolant tubes 3 contain fuel elements 4 of a conventional finned tube type and the remainder are filled with a suspension of nickel catalyst 5 which provides a large surface area to the coolant while permitting it to flow through tubes 3. Fuel elements 4 may also be plated or clad with nickel catalyst to promote the chemical reaction reforming the methane and steam mixture passing through the coolant tubes 3 into carbon monoxide and hydrogen. Coolant tubes 3 are fabricated from the same or an equivalent catalytic alloy to promote the chemical reaction.

The arrangement and spacing in FIG. 1 of coolant channels containing fuel elements 4 as compared to those containing catalyst 5 is illustrative only, and is subject to variation depending on such factors as the fuel enrichment used and the reactor power density requirements. The one to one ratio of coolant tubes 3 containing fuel elements 4 to those containing catalyst 5, as shown in FIG. 1, is illustrative only and can be varied depending on system requirements. Where high power density is desired, a greater proportion of coolant tubes containing fuel elements would be used.

Figure 2:
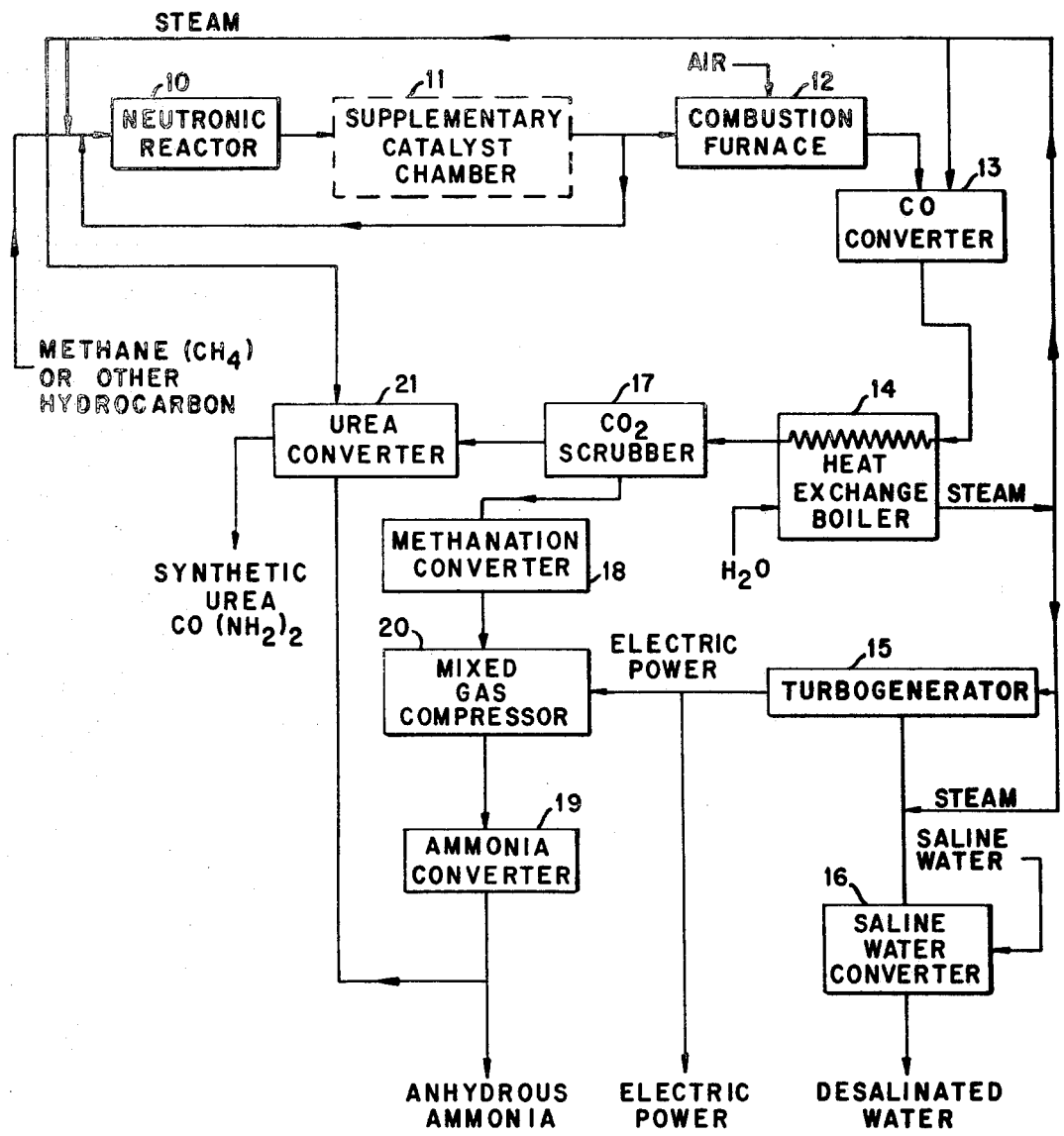
FIG. 2 is a schematic flow diagram illustrating an operating arrangement for a reactor and associated apparatus in accordance with the invention.

Referring now to the schematic flow diagram of FIG. 2, a neutronic reactor 10 is cooled by a mixture of gases which undergo, in part, an endothermic chemical reaction as they pass through the reactor. Specifically, the endothermic reaction reforms the steam-hydrocarbon mixture to hydrogen and carbon monoxide. A suitable catalyst to promote this chemical reaction within reactor 10 may be provided in the form of cladding on the reactor fuel elements, coolant channel liners, and as a suspension of catalyst in coolant channels through the reactor as described in reference to FIG. 1. For the design of the chemical reaction zone located adjacent to the neutronic reactor, a separate catalyst chamber 11 may be provided to supplement the active core reaction zone on the hot effluent gas stream from the neutronic reactor. This invention utilizes a chemical reaction zone entirely within the reactor or in combination with a supplementary chemical reaction zone located adjacent to the reactor. A reaction temperature between about 700° C. and about 1000° C. is accomplished by conventional control of the reactor power level, by regulating the ratio of steam to hydrocarbon in the coolant entering the reactor, and by recycling a portion of the reformed hydrogen-carbon monoxide mixture discharging from the reactor to preheat the incoming steam-hydrocarbon coolant. Maintenance of a suitable reaction temperature ensures the early initiation of the reforming reaction within the reactor.

The hot gas mixture discharging from the reactor 10 is made up of reformed hydrogen and carbon monoxide gas as well as an unconverted fraction of hydrocarbon. A portion of the hot gas mixture discharging from the reactor or catalyst chamber 11 is recycled through the reactor after mixing with and preheating the steam-hydrocarbon feed to the reactor. The remaining portion of the gas discharge mixture is then passed to a combustion furnace 12 where compressed air is injected (if ammonia is to be manufactured). Nitrogen is obtained in combustion furnace 12 through the deoxygenation of the injected air.

The mixture of carbon monoxide, carbon dioxide, hydrogen and nitrogen which is discharged from furnace 12 next passes to a carbon monoxide converter 13 where steam is injected to react with and convert the carbon monoxide to carbon dioxide. Hydrogen gas is formed in converter 13 as a by-product of the conversion.

The mixture of carbon dioxide, hydrogen and nitrogen gas discharged from converter 13 is passed through a heat exchange boiler 14 where the gas mixture gives up heat to generate steam for use in reactor 10, converter 13, turbogenerator 15, and a saline water converter 16 of the conventional distillation type. The cooled gas mixture is then passed to a carbon dioxide scrubber 17 where the carbon dioxide in the mixture is separated from the hydrogen and nitrogen.

Remaining traces of hydrocarbon are removed by passing the gas mixture from scrubber 17 through a methanation catalyst in converter 18. The hydrogen and nitrogen discharged from ethanation converter 18 are compressed to a pressure suitable for conversion to anhydrous ammonia in ammonia converter 19 by a mixed gas compressor 20 which receives its power supply from turbogenerator 15. A portion of the anhydrous ammonia produced by ammonia converter 19 is passed to urea converter 21 where it reacts with carbon dioxide from scrubber 17 to form synthetic urea. The remaining portion of anhydrous ammonia could be added to a portion of the desalinated water produced by saline water converter 16 and pumped inland for irrigation using power produced by turbogenerator 15.

Thus, the multi-purpose neutronic reactor provided by the invention is highly suited for use in underdeveloped countries having concurrent needs for power, fresh water, fertilizer and basic supplies of chemicals such as urea to provide a base for a chemical industry. A source of hydrocarbons such as methane is the only raw material required in addition to water, which may be obtained directly from the ocean in coastal areas, and air which is available everywhere.

The above description of the invention was offered for illustrative purposes only, and should not be interpreted in a limiting sense. It is intended rather that the invention be limited only by the claim appended hereto.

What is claimed is:
1. A method of operating a neutronic reactor provided with a plurality of coolant channels extending through its active core region, fuel elements containing fissionable material disposed in a first portion of said coolant channels, and chemical catalyst disposed in a second portion of said coolant channels comprising: cooling said reactor with a single coolant stream directed to contact both said fuel elements and said catalyst material during passage through said coolant channels, said coolant stream comprising a mixture of steam and at least one other gaseous material which reacts with steam in an endothermic chemical reaction to form hydrogen and other reaction products under conditions existing within said coolant channels, the flow rate of said single coolant stream being sufficient to maintain an operating reaction temperature within said reactor in the range of 700° C. to 1000° C.; withdrawing said coolant from said reactor; recycling a portion of said withdrawn coolant to preheat said coolant stream prior to its entry into said coolant channels; directing the remainder of said withdrawn coolant stream into a heat exchange boiler to generate steam; withdrawing a first portion of said steam generated in said boiler and mixing it with said other gaseous material to form said coolant stream prior to its entry into said coolant channels; withdrawing a second portion of said steam generated in said boiler and directing it to a turbogenerator to produce electrical energy; and removing said reaction products from said withdrawn coolant stream.

References Cited

UNITED STATES PATENTS

| | | | |
|---|---|---|---|
| 2,905,606 | 9/1959 | Long et al. | 176—39 X |
| 3,228,848 | 1/1966 | Fellows | 176—39 X |
| 3,293,138 | 12/1966 | Schalten | 176—39 X |
| 3,303,098 | 2/1967 | Lagowski | 176—39 X |

FOREIGN PATENTS 349,450  10/1960  Switzerland.

OTHER REFERENCES

Steinberg, M.: BNL 959 (T399), Brookhaven National Laboratory, December 1964, pp. 1–3, 10, 11, 12, 13, 24, 25.

REUBEN EPSTEIN, *Primary Examiner.*